(12) United States Patent
Lalgudi et al.

(10) Patent No.: US 8,222,367 B2
(45) Date of Patent: Jul. 17, 2012

(54) POLYMERS FOR USE IN FUEL CELL COMPONENTS

(75) Inventors: Ramanathan S. Lalgudi, Westerville, OH (US); Bhima R. Vijayendran, Carlsbad, CA (US); Jeffrey Cafmeyer, Columbus, OH (US); Jay R. Sayre, Albany, OH (US)

(73) Assignee: Battelle Memorial Institute, Columbus, OH (US)

( * ) Notice: Subject to any disclaimer, the term of this patent is extended or adjusted under 35 U.S.C. 154(b) by 419 days.

(21) Appl. No.: 11/992,827

(22) PCT Filed: Sep. 29, 2006

(86) PCT No.: PCT/US2006/038281
§ 371 (c)(1),
(2), (4) Date: May 17, 2010

(87) PCT Pub. No.: WO2007/041415
PCT Pub. Date: Apr. 12, 2007

(65) Prior Publication Data
US 2010/0234479 A1  Sep. 16, 2010

Related U.S. Application Data

(60) Provisional application No. 60/722,857, filed on Sep. 30, 2005, provisional application No. 60/731,441, filed on Oct. 28, 2005, provisional application No. 60/736,815, filed on Nov. 15, 2005, provisional application No. 60/748,658, filed on Dec. 8, 2005.

(51) Int. Cl.
    C08G 8/02 (2006.01)
(52) U.S. Cl. ........ 528/125; 528/171; 528/295; 528/220; 528/373; 521/27; 521/30; 521/25; 429/479; 429/480; 429/498
(58) Field of Classification Search .................. 528/125, 528/171, 295, 220, 373; 521/27, 30, 25; 429/479, 480, 498.498, 498
See application file for complete search history.

(56) References Cited

U.S. PATENT DOCUMENTS

| | | | |
|---|---|---|---|
| 5,288,834 A | 2/1994 | Roovers et al. | |
| 5,429,759 A | 7/1995 | Andrieu et al. | |
| 5,525,436 A | 6/1996 | Savinell et al. | |
| 5,599,638 A | 2/1997 | Surampudi et al. | |
| 5,795,496 A | 8/1998 | Yen et al. | |
| 5,817,718 A | 10/1998 | Nezu et al. | |
| 5,834,523 A | 11/1998 | Steck et al. | |
| 5,985,477 A | 11/1999 | Iwasaki et al. | |
| 6,059,943 A | 5/2000 | Murphy et al. | |
| 6,124,060 A | 9/2000 | Akita et al. | |
| 6,183,914 B1 | 2/2001 | Yao et al. | |
| 6,268,430 B1 | 7/2001 | Choi et al. | |
| 6,670,065 B2 | 12/2003 | Koyama et al. | |
| 6,723,757 B1 | 4/2004 | Kerres et al. | |
| 2003/0096149 A1 | 5/2003 | Koyama et al. | |
| 2003/0129467 A1 | 7/2003 | Morishima et al. | |
| 2005/0031930 A1 | 2/2005 | Koyama et al. | |

FOREIGN PATENT DOCUMENTS

| | | |
|---|---|---|
| DE | 1 910 480 | 9/1970 |
| EP | 0296398 A1 | 12/1988 |
| EP | 1 110 992 | 6/2001 |
| EP | 1 113 517 | 7/2001 |
| EP | 1314751 A1 | 5/2003 |
| EP | 1 348 716 | 10/2003 |
| EP | 1 739 780 | 1/2007 |
| JP | 2000119420 A | 4/2000 |
| WO | WO 98/42037 | 9/1998 |
| WO | 9952954 | 10/1999 |
| WO | WO 99/54407 | 10/1999 |
| WO | WO 00/49069 | 8/2000 |
| WO | WO 01/64322 | 9/2001 |
| WO | WO 02/05370 | 1/2002 |
| WO | WO 02/087001 | 10/2002 |
| WO | WO 03/067691 | 8/2003 |

(Continued)

OTHER PUBLICATIONS

Tomoaki, Patent Abstracts of Japan, Ion Exchange Membrane and Its Preparation, App No. 10297266, Oct. 19, 1998, European Patent Office.

(Continued)

Primary Examiner — Randy Gulakowski
Assistant Examiner — Shane Fang
(74) Attorney, Agent, or Firm — MacMillan, Sobanski & Todd, LLC

(57) ABSTRACT

A proton conducting hydrocarbon-based polymer has acid groups on side chains attached to the main chain, where the acid groups are between 7 and 12 atoms away from the main chain. Another polymer includes a semi-fluorinated aromatic hydrocarbon main chain and side chains that include at least one —CF2— group and an acid group. Another polymer includes an aromatic hydrocarbon main chain and side chains that include at least one —CH2-CF2— group and an acid group. Another aromatic polymer includes acid groups attached to both the main chain and the side chains where less than about 65 weight percent of the acid groups are attached to the side chains. Another aromatic polymer includes side chains attached to the main chain that include at least one aryl ring, and acid groups attached to both the main chain and to the aryl groups. Another polymer includes an aliphatic hydrocarbon main chain, side chains that include at least one deactivating aryl ring, and acid groups attached to the deactivating aryl rings. Another aliphatic polymer has side chains that include —CF2— groups and an acid group. A fuel cell component includes a proton conducting polymer, a water insoluble inorganic material, and a heteropolyacid immobilized on the inorganic material.

15 Claims, No Drawings

FOREIGN PATENT DOCUMENTS

| WO | WO 2004/016665 | 2/2004 |
|---|---|---|
| WO | WO 2007/041415 | 4/2007 |

OTHER PUBLICATIONS

Smitha et al., Solid Polymer Electrolyte Membranes for Fuel Cell Applications—a Review, Science Direct, Mar. 23, 2004, Journal of Membrane Science 259 (2005) 10-26.

Okamoto et al., Methanol Permeability and Proton Conductivity of Sulfonated CoPolyimide Membranes, Science Direct, Sep. 4, 2004, Journal of Membrane Science 258 115-122.

Li et al., Approaches and Recent Development of Polymer Electrolyte Membranes for Fuel Cells Operating above 100 C, Chem. Mater. 2003, 15, 4896-4915.

Souzy et al., Functional Fluoropolymers for Fuel Cell Membranes, Science Direct, Sep. 20, 2004, Prog. Polym. Sci. 30 (2005) 644-687.

Yeo et al., Physical Properties and Supermolecular Structure of Perflourinated Ion-Containing Polymers, Journal of Applied Polymer Science, vol. 21, No. 4, pp. 875-898 (1977).

Yeager et al. Transport Properties of Perfluorosulfonate Polymer Membranes, Perflourinated Ionomer Membranes, Perflourinated Ionomer Membranes, No. 180, pp. 1-6 and 41-63 (1982).

Kreuer, On the Development of Proton Conducting Polymer Membranes for Hydrogen and Methanol Fuel Cells, Journal of Membrane Science, vol. 185, pp. 29-39 (2001).

Ise et al., Electroosmotic Drag in Polymer Electrolyte Membranes: An Electrophoretic NMR Study, Solid State Ionics, vol. 125, pp. 213-223 (1999).

International Search Report, PCT/US2006/038281, Sep. 2006, Battelle Memorial Institute.

Co-Pending U.S. Appl. No. 10/912,590, filed Aug. 5, 2004.

Serpico, J.M., et al., Transport and Structural Studies of Sulfonated Styrene—Ethylene Copolymer Membranes', Macromolecules, 2002, 35, 5916-5921.

Smitha, B, et al., "Solid Polymer Electrolyte Membranes for Fuel Cell Applications—A Review", Journal of Membrance Science, 2005, 259, 10-26.

Souzy, R., et al., "Functional Fluoropolymers for Fuel Cell Membranes", Progress in Polymer Science, 2005, 30, 644-687.

European Search Report Communication, Application No. EP06836164.1, Date Sep. 29, 2006.

European Search Report Communication, Application No. EP11170814.5, Date Sep. 29, 2006.

POLYMERS FOR USE IN FUEL CELL COMPONENTS

CROSS-REFERENCE TO RELATED APPLICATIONS

This application claims the benefit of U.S. Provisional Application No. 60/722,857, filed Sep. 30, 2005, U.S. Provisional Application No. 60/731,441, filed Oct. 28, 2005, U.S. Provisional Application No. 60/736,815, filed Nov. 15, 2005, and U.S. Provisional Application No. 60/748,658, filed Dec. 8, 2005, the disclosures of which are incorporated herein by reference.

BACKGROUND OF THE INVENTION

This invention relates in general to polymers, and in particular to proton conducting polymers suitable for use in fuel cell components, such as polymer electrolyte membranes and electrodes of fuel cells.

Fuel cells are a promising technology for generating electricity with higher efficiency and lower emissions than most current methods. Polymer electrolyte membrane ("PEM") fuel cells include a proton conducting polymer membrane sandwiched between an anode and a cathode. A fuel such as hydrogen or methanol is flowed into contact with the anode where it dissociates into electrons and protons. The electrons, which cannot pass through the membrane, flow from the anode to the cathode through an external circuit containing an electric load, which consumes the power generated by the cell. On the opposite side of the cell, the cathode adsorbs oxygen from the air, generating a potential that pulls the electrons through the external circuit to give them to the adsorbed oxygen. When an adsorbed oxygen receives two electrons it forms a negatively charged oxygen anion. The polymer electrolyte membrane allows the protons to diffuse through the membrane. When two protons encounter an oxygen anion they join together to form water.

While there has been substantial progress in fuel cells, the barriers that remain for commercialization are significant. In particular, the cost of fuel cells remains high. The most commonly used polymer electrolyte membranes are fluorinated polymer membranes sold under the tradename Nafion® by DuPont, which are sold at a relatively high cost. The fluorinated polymer membranes also have other drawbacks, such as poor durability at high temperatures, susceptibility to contamination by carbon monoxide at normal operating temperatures, methanol crossover in a direct methanol fuel cell, and poor water management characteristics.

Therefore, it would be desirable to provide alternative proton conducting polymers for use in making polymer electrolyte membranes of fuel cells.

In addition to polymer electrolyte membranes, proton conducting polymers can also be used in other fuel cell components. For example, they can be used as binders along with particles of carbon-supported catalyst in the preparation of electrodes for fuel cells. It would be desirable to provide alternative proton conducting polymers for use in making other fuel cell components such as electrodes.

SUMMARY OF THE INVENTION

This invention relates to a proton conducting hydrocarbon-based polymer including an aromatic hydrocarbon polymer main chain, side chains attached to the main chain, and acid groups attached to the side chains, where the acid groups are attached to atoms on the side chains that are between 7 and 12 atoms away from the main chain.

The invention also relates to a proton conducting hydrocarbon-based polymer including a semi-fluorinated aromatic hydrocarbon polymer main chain and side chains attached to the main chain, where the side chains include at least one —CF2— group in the side chain and an acid group attached to the side chain.

The invention also relates to a proton conducting hydrocarbon-based polymer including an aromatic hydrocarbon polymer main chain and side chains attached to the main chain, where the side chains include at least one —CH2-CF2— group in the side chain and an acid group attached to the side chain.

The invention also relates to a proton conducting hydrocarbon-based polymer including an aromatic hydrocarbon polymer main chain and side chains attached to the main chain, and including acid groups attached to both the main chain and the side chains where less than about 65 weight percent of the acid groups are attached to the side chains.

The invention also relates to a proton conducting hydrocarbon-based polymer including an aromatic hydrocarbon polymer main chain, side chains attached to the main chain that include at least one aryl ring, and acid groups attached to both the main chain and to the aryl groups of the side chains.

The invention also relates to a proton conducting hydrocarbon-based polymer including an aliphatic hydrocarbon polymer main chain, side chains attached to the main chain that include at least one deactivating aryl ring, and acid groups attached to the deactivating aryl rings of the side chains.

The invention also relates to a proton conducting hydrocarbon-based polymer including an aliphatic hydrocarbon polymer main chain, and side chains attached to the main chain that include —CF2— groups in the chain and an acid group attached to the side chain.

DETAILED DESCRIPTION OF THE PREFERRED EMBODIMENTS

The present invention provides several embodiments of proton conducting polymers that can be used for making fuel cell components for fuel cell systems. The fuel cell components can be any type in which the polymers are determined to be useful. Some nonlimiting examples include membrane electrode assemblies, membranes, electrodes, catalyst inks, gas diffusion layers, and binders for making membrane electrode assemblies.

1. Side Chain Sulfonic Acid —CH2—>6 or Sulfonic Acid —CF2— or —CH2-CF2—

The polymer is a proton conducting hydrocarbon-based polymer. By "proton conducting" is meant that the polymer allows protons to diffuse through a membrane of the polymer at a rate sufficient for use as a polymer electrolyte membrane in a fuel cell. By "hydrocarbon-based" is meant that the polymer consists predominantly of carbon and hydrogen atoms along its main chain, although other atoms can also be present. This excludes perfluorinated polymers of the Nafion® type such as disclosed in U.S. Pat. No. 5,094,995 (incorporated by reference herein).

The polymer includes an aromatic hydrocarbon polymer main chain. Preferably, the aromatic polymer is resistant to oxidation of the main chain. Any suitable aromatic polymer(s) can be used in the main chain. Some nonlimiting examples include polysulfone (PS), polyether ketone (PEK), polyether ether ketone (PEEK), polyether sulfone (PES), and polythioether sulfone.

The polymer also includes side chains attached to the main chain. The polymer further includes acid groups attached to the side chains. As used herein, the term "acid groups" includes both acid groups and salts of acid groups. Any suitable acid groups can be used for making the polymers, such as sulfonate groups, carboxylic acid groups, phosphonic acid groups, phosphinic acid groups, or boronic acid groups. Mixtures of different acid groups can also be used. Preferably, the acid groups are sulfonate groups. In some embodiments, the acid groups are terminal groups, i.e., attached to the ends of the side chains.

In one aspect of the first embodiment of the invention, the acid groups are attached to atoms on the side chains that are between 7 and 12 atoms away from the main chain. At least about 65% by weight of the total acid groups of the polymer are attached at one of these locations, preferably at least about 75%, more preferably at least about 85%, and most preferably substantially all the acid groups. For example, the side chains may consist of hydrocarbon side chains, and the acid groups may be attached carbon atoms that are between 7 and 12 carbon atoms away from the main chain. In a preferred embodiment, the side chains include more than six —CH2— groups, and the acid groups are attached to —CH2— groups that are more than six away from the main chain.

In another aspect of the first embodiment of the invention, the polymer includes an aromatic hydrocarbon polymer main chain, but the main chain is semi-fluorinated. By "semi-fluorinated" is meant that, although the polymer consists predominantly of carbon and hydrogen atoms along the main chain, the polymer also includes a substantial portion of fluorine atoms along the main chain. In one embodiment, the main chain includes —C(CF$_3$)$_2$— groups. Any suitable semi-fluorinated aromatic hydrocarbon polymer(s) can be used in the main chain.

The polymer also includes side chains attached to the main chain. The side chains include at least one —CF2— group in the side chain. In one embodiment, the side chains include at least two or three groups in the side chain. The side chains also include acid groups attached to the side chains, such as the acid groups described above. In some embodiments, the chain consists essentially of the —CF2— groups except for a terminal acid group.

In another aspect of the first embodiment of the invention, the polymer includes an aromatic hydrocarbon polymer main chain, and it includes side chains that include at least one —CH2-CF2— group in the side chain. In one embodiment, the side chains include at least two or three —CH2-CF2— groups in the side chain. The side chains also include acid groups attached to the side chains, such as the acid groups described above. In some embodiments, the chain consists essentially of the —CH2-CF2— groups except for a terminal acid group.

Some preferred polymers according to the first embodiment of the invention are shown below:

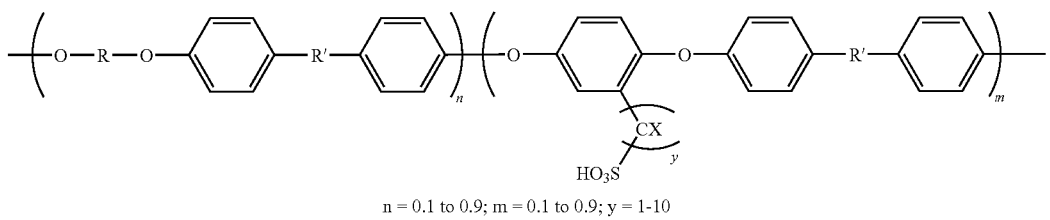

n = 0.1 to 0.9; m = 0.1 to 0.9; y = 1-10

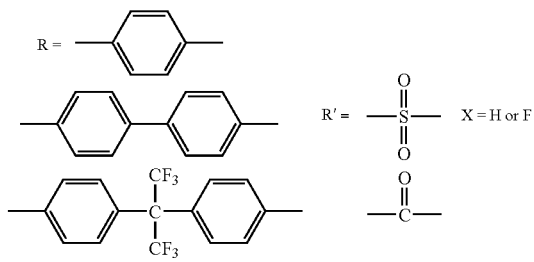

X = H or F

2. Mixed Main Chain and Side Chain Sulfonic Acids

The polymer includes an aromatic hydrocarbon polymer main chain and side chains attached to the main chain. In some embodiments, the side chains include —CH2— groups or —CF2— groups. The polymer also includes acid groups, such as those described above, attached to both the main chain and the side chains. Preferably, less than about 65 weight percent of the acid groups are attached to the side chains.

Some preferred polymers according to the second embodiment of the invention are shown below:

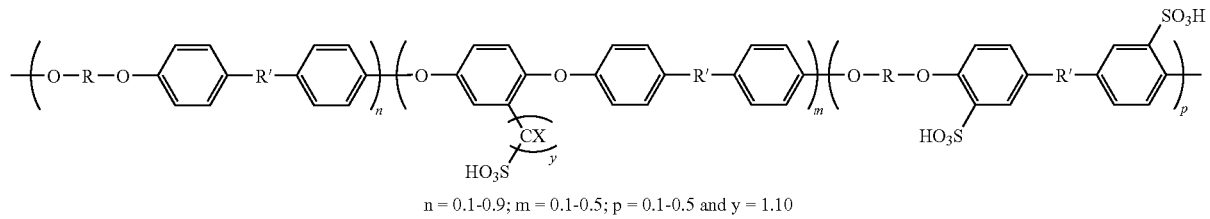

n = 0.1-0.9; m = 0.1-0.5; p = 0.1-0.5 and y = 1.10

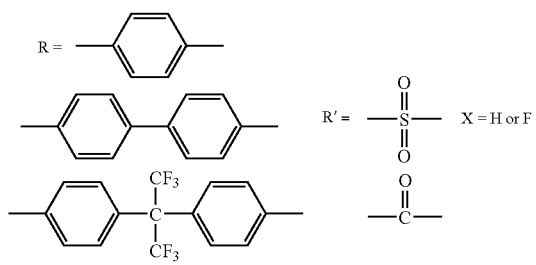

3. Side Chain Aryl Sulfonic Acid

The polymer includes an aromatic hydrocarbon polymer main chain. The polymer also includes side chains attached to the main chain that include at least one aryl ring. In some embodiments, the side chains include at least two or three aryl rings. The side chains may include other groups in addition to the aryl rings.

The polymer further includes acid groups, such as those described above, attached to both the main chain and to the aryl groups of the side chains. In some embodiments, the side chains include two or more acid groups attached to each side chain. The acid groups attached to the main chain can be attached at any suitable locations; typically, they are attached to the aryl groups of the main chain.

In a preferred embodiment, the polymer is obtained from sulfonated dihalo monomer with the following general structure:

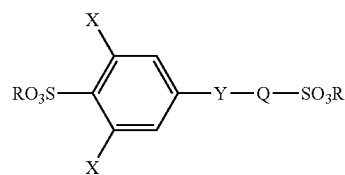

wherein:
R=H, Li, Na, K, Cs
X=F, Cl,
Y=bond, —C(=O)—, —SO2— —C(CF$_3$)$_2$—, —(CH2)n- n=1-10,
Q=bond, aryl, alkyl, fluoroalkyl, fused heterocyclics etc. . . .

A preferred polymer according to the third embodiment of the invention is shown below:

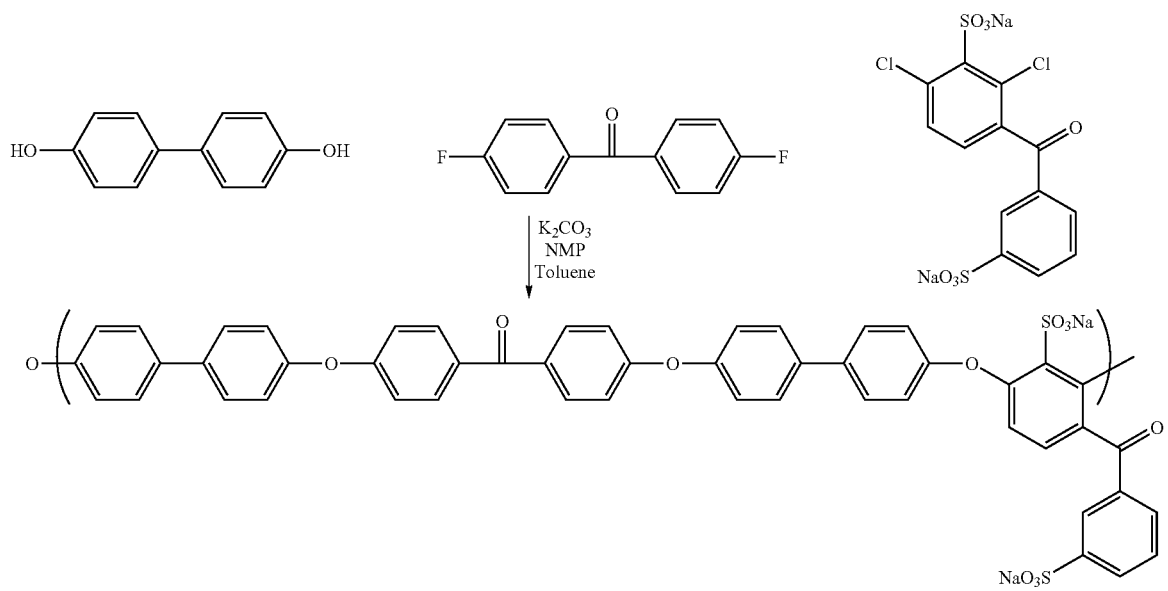

4. Main Chain Aliphatic Hydrocarbon and Side Chain Aromatic Sulfonic Acid

The polymer includes an aliphatic hydrocarbon polymer main chain. The polymer also includes side chains attached to the main chain that include at least one deactivating aryl ring, and acid groups attached to the deactivating aryl rings of the side chains. By "deactivating" aryl ring is meant that the proton conducting acid groups are placed meta to the deactivating functional groups such as sulfone, ketones, nitriles, nitro, quaternary ammonium salts, etc. These deactivating functional groups cause the aromatic ring to be less prone for the elimination of proton conducting acid groups from the membrane under fuel cell operating conditions. The placement of the acid groups on deactivating aryl rings may avoid an elimination reaction and undesirable crosslinking during fuel cell operation.

In some embodiments of the invention, the polymer is obtained by reacting polymers with functional groups that undergo substitution reaction with aromatic halo compounds. For example, the aromatic halo compounds may be sulfonated aromatic halo compounds with the following general structure:

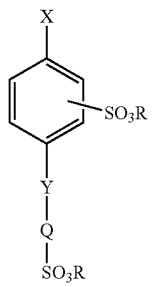

wherein:
R=H, Li, Na, K, Cs
X=F, Cl,
Y=bond, —C(=O)—, —SO2— —C(CF$_3$)$_2$—, —(CH2)n- n=1-10,
Q=bond, aryl, alkyl, fluoroalkyl, fused heterocyclics etc. . . .

Some preferred polymers according to the fourth embodiment of the invention are shown below:

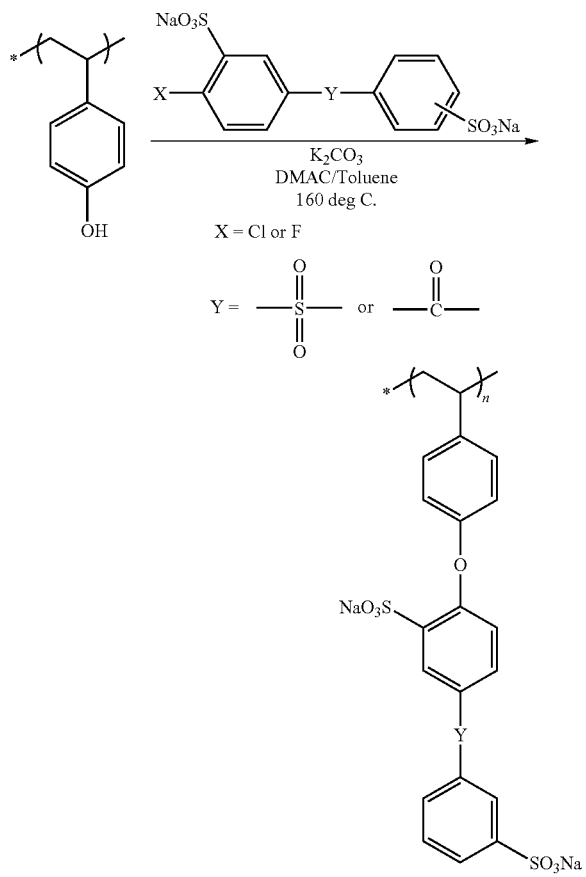

5. Main Chain Aliphatic Hydrocarbon and Side Chain Fluoro Alkyl Sulfonic Acid

The polymer includes an aliphatic hydrocarbon polymer main chain. The polymer also includes side chains that include —CF2— groups. In some embodiments, the side chains include two or three or more —CF2— groups. The polymer also includes acid groups attached to the side chains. In some embodiments, the acid groups are attached at the ends of the side chains.

A preferred polymer according to the fifth embodiment of the invention is shown below:

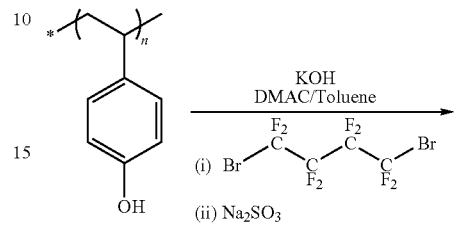

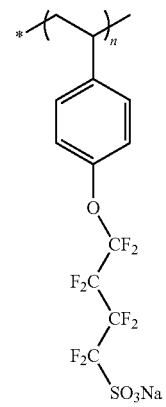

6. Chemically Bonded Inorganic Additives to any of the Polymers

The polymer includes any of the polymers described in the first five embodiments of the invention, and it further includes one or more inorganic additives chemically bonded (covalently or ionically bonded) to the polymer. The additive improves the properties of the polymer. Such additives may include, for example, imidazole, lignosulfonate, phosphotungstic acid, polytungstic acid, cesium hydrosulfate, zirconium oxy salt, phosphomolybdic acid, or tungsto silicic acid.

In contrast to the chemically bonded additives of the invention, physical blends of inorganic additives and polymers tend to leach out over time due to their inherent water solubility. By chemically bonding these additives, one may eliminate this leaching and improve the durability of the membrane. For example, durability may be improved because the chemically bound additives reduce water uptake in the membranes, thereby improving membrane mechanical properties and fatigue resistance (from shrink-swell cycles). By chemically binding these additives, one may also control the placement of the additives either near or far from the acid group depending on the intended application. This may further improve performance and durability by providing some level of control over water transport throughout the membrane. Physically blended additives would not effect the $T_g$ of the membrane, but chemically bound additives may increase the $T_g$, which may reduce creep and pinhole formation at high-temperature and low RH.

7. Chemically Bonded Metal Phosphate or Phosphonate

The polymer includes any of the polymers described in the first five embodiments of the invention, and it further includes a metal phosphate or phosphonate chemically bonded to the polymer. In contrast to physical blends of these material and polymers, the chemically bonded materials may result in advantages for the fuel cell components. Any suitable phosphate or phosphonate, or combinations thereof, can be used. Some nonlimiting examples include metal phosphate, metal phosphonate, metal hydrogen phosphate, metal hydrogen phosphonate, metal pyrophosphate, and metal sulpho phenyl phosphate. Any suitable metal group, or combinations thereof, can be used. Some nonlimiting examples include transition metals such as Ti, V, Mn, Fe, Co, Ni, Cu, Zn, Zr, Mo, Ru, Rh, Pd, Ag, Cd, W, Pt and Au, and non-transition metals such as B, Al, Ga, In, Tl, Si, Ge, Sn, Se and Te. In one embodiment zirconium is the preferred metal.

A preferred polymer according to seventh embodiment of the present invention is a basic polymer capable of forming complex with acids. Such basic polymers may include but not limited to Poly(vinylpyridine), Poly(5,5'-bibenzimidazole-2,2'-biphenylylene), Poly(2,6-benzimidazole-diylsulfonyl-5,2-benzimidazolediyl-1,3-phenyl ene), Poly(m-phenylene), o,m-2-benzoxazole, Poly(m-phenylene), o,m-5-methyl-2-benzoxazole, Poly(arylene-1,3,4-oxadiazole), Poly(aryl ether phthalazine). A preferred polymer is shown below:

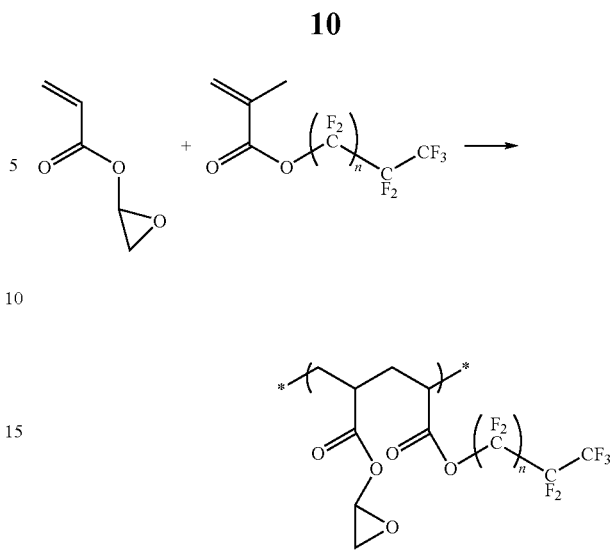

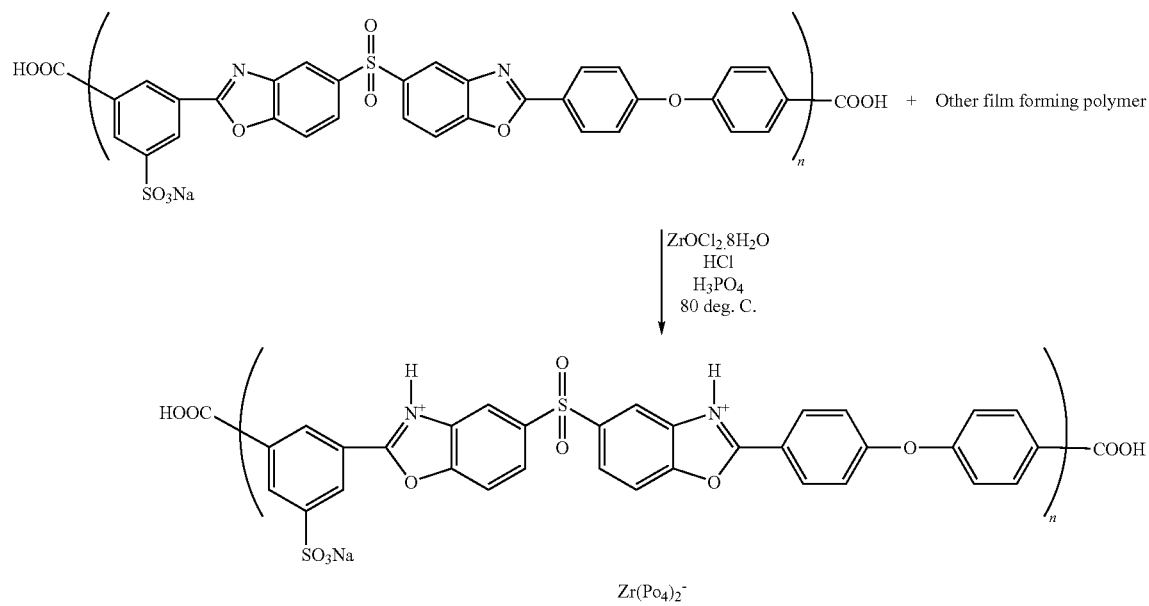

This invention includes addition of hydrophobic modifiers, particularly perfluorinated polymer or copolymers (as shown below), to polymer electrolyte membranes made with poly(arylene ether sulfone) polymer and other hydrocarbon based polymers in order to reduce swelling. The perfluorinated copolymers are macroscopically compatible with the poly(arylene ether sulfone) up to 30 weight percent.

This invention also includes a method of making poly(sulfone ether benzazole), particularly poly(sulfone ether benzoxazole) and poly(sulfone ether benzimidazole) (both shown below), and composites thereof with polymer electrolyte membranes made with poly(arylene ether sulfone) and other hydrocarbon based polymers.

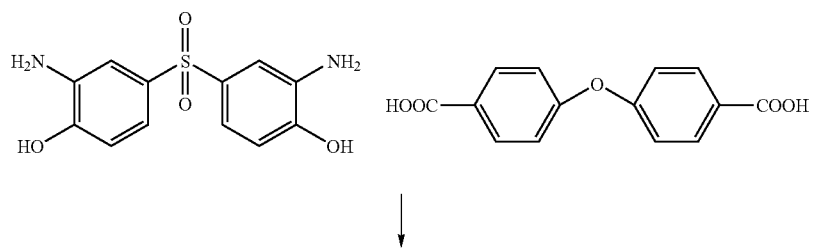

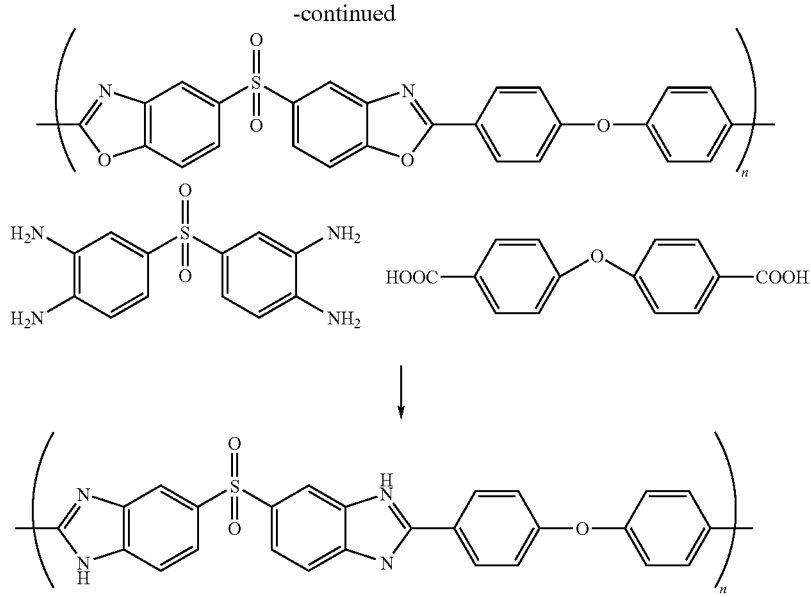

EXAMPLES

Example 1

This Example describes the synthesis of aromatic hydrocarbon PEM with aryl sulfonic acid in the side chain Step 1: Synthesis of aryl sulfonic acid monomer (1)
Scheme : Synthesis of aryl sulfonic acid monomer (1)

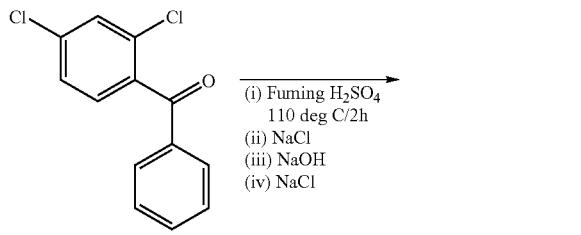

Monomer 1

In a typical experimental procedure, 10 grams of 2,4-dichlorobenzophenone was weighed in a three neck 250 milliliter (ml) round bottom flask equipped with an overhead stirrer, inlet for inert gas and a condenser. Fuming sulfuric acid (15 ml) was slowly added to the flask. The content in the flask was slowly heated using an oil bath to 110° C. and kept at that temperature for 2 hours and then cooled to room temperature. The solution was poured on to 250 ml of ice cold water. The acidic solution was neutralized with NaOH and salted out using NaCl. The product was isolated by filtration and washed several times with saturated NaCl solution. The product was then recrystallized from hot ethanol.

Step 2: Synthesis of PEM Using 2,4-dichlorobenzophenone

In a resin kettle fitted with a stir rod, thermocouple, Dean Stark condenser and inlet for gas purging, we charged bisphenol A (5.0018 grams, 0.0219 moles), 4,4'-difluorobenzophenone (3.3425, 0.0153 moles), 2,4-dichlorobenzophenone (1.6575 grams, 0.0066 moles), $K_2CO_3$ (6.1 gram) 80 ml N-methyl-2-pyrrolidinone and 40 ml toluene. The reagents were heated slowly until the reflux temperature reached (~133° C.) and maintain the reflux for 4 hours. Toluene was gradually removed and increased the temperature to 180° C. The reaction was maintained for 20 hours at that temperature. At the end of 20 hours, the reaction mixture was cooled down to 80° C. and the polymer solution filtered using a Buchner funnel fitted with Whatman filter paper No 4. The filtered polymer solution was isolated by precipitating in water and drying in a vacuum oven at 120° C. for 24 hours. In principle one can use monomer (1) in place of 2,4-dichlorobenzophenone to get PEM with aryl sulfonic acid side chains.

Example 2

This example describes the synthesis of aliphatic hydrocarbon PEM with aryl sulfonic acid in the side chain.

Step 1: Synthesis of Monomer (2)
Scheme : Synthesis of Monomer (2)

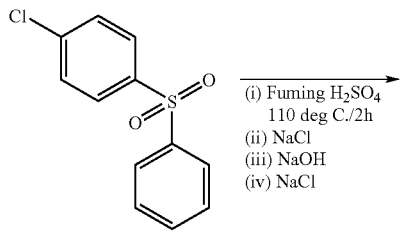

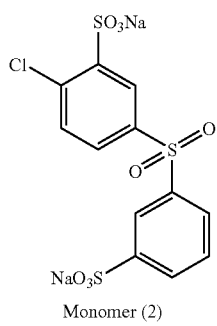

Monomer (2)

Monomer 2 was synthesized according to the above mentioned reaction scheme. In a typical experimental procedure, 10 grams of 4-chlorophenylsulfone was weighed in a three neck 250 ml round bottom flask equipped with an overhead stirrer, inlet for inert gas and a condenser. Fuming sulfuric acid (40 grams) was slowly added to the flask. The content in the flask was slowly heated using an oil bath to 110° C. and kept at that temperature for 2 hours and then cooled to room temperature. The solution was poured on to 250 ml of ice cold water. The acidic solution was neutralized with NaOH and salted out using NaCl. The product was isolated by filtration and washed several times with saturated NaCl solution. The product was then recrystallized from hot methanol.

Step 2: Synthesis of Polymer

In a 100 ml three neck round bottom flask, fitted with a stir rod, thermocouple, Dean Stark condenser and inlet for gas purging, we charged 1 gram of poly(4-vinylphenol) (obtained from Aldrich with an average molecular weight of 8000), 1.22 grams of monomer 2 (0.0028 moles) $K_2CO_3$ (0.4 gram, 0.0029 moles) 25 ml N,N-dimethylacetamide and 25 ml toluene. The reagents were heated slowly till the reflux temperature reached (~133° C.) and maintain the reflux for 4 hours. Toluene was gradually removed and increased the temperature to 160° C. The reaction was maintained for 20 hours at that temperature. At the end of 20 hours, the reaction mixture was cooled down to 80° C. and the polymer solution filtered using a Buchner funnel fitted with Whatman filter paper No 4. The filtered polymer solution was isolated by precipitating in water and drying in a vacuum oven at 120° C. for 24 hours.

Example 3

This example demonstrates ionically bound zirconium hydrogen phosphate to a PEM. For this purpose, a nitrogen containing heterocyclic polymer was made according to the following procedure: In a resin kettle fitted with a stir rod, thermocouple, condenser and inlet for gas purging, we charged 3,3' diamino-4,4'-dihydroxydiphenylsulfone (4.916 grams, 0.017 moles), 4,4'-oxybis(benzoic acid) (2.944 grams, 0.0114 moles), 5-sulfoisophthalic acid (1.548 grams, 0.0061 moles) and 137 grams of poly phosphoric acid. The reagents were heated to 160° C. and maintained the temperature for 4 hours. The temperature was raised to 190° C. and maintained the temperature for 20 hours. The contents in the flask were poured on to 2 L distilled water and the polymer obtained is washed with 10% ammonium hydroxide solution followed by water wash to neutral pH. The polymer was dried in a vacuum oven at 120° C. for 24 hours to obtain dry polymer. The above made nitrogen containing heterocyclic polymer (1 gram) was mixed with poly (aryl ether sulfone) (1 gram) and dissolved in 5 ml of dimethyl acetamide. The polymer solution is cast on glass plate and the solvent was removed by heat to obtain free standing film. The polymer film was soaked in 12% (weight/volume) of $ZrOCl_2 \cdot 8H_2O$ in HCl. After three hours the film was removed and dipped in 50% phosphoric acid solution for 30 minutes. The polymer film was transferred to another glass tray and kept in an oven for 3 hours at 80° C. The film was removed from the oven, cooled to room temperature and washed with water till the washings are neutral to litmus paper. The polymer film is dried in an oven at 120° C. for 4 hours. The difference in weight between the neat polymer film and the $ZrOCl_2 \cdot 8H_2O$ treated film shows ~2 weight percent incorporation of zirconium hydrogen phosphate $Zr(HPO_4)_2$ in the polymer membrane. The $Zr(HPO_4)_2$ containing polymer film (0.1672 gram) was extracted with hot water for 24 hours and the polymer film was dried in a vacuum oven for 6 hours. The weight of polymer film after extraction remained the same which indicate $Zr(HPO_4)_2$ is bound to the polymer membrane.

Control Example 1

Sulfonated Poly (Aryl Ether Sulfone)/Zirconium Hydrogen Phosphate Composite Membranes A known dimension (4 cm×4 cm) of sulfonated poly(aryl ether sulfone) membrane with % sulfonic acid ~35% was taken in a beaker and added 50 ml aqueous solution of $ZrOCl_2 \cdot 8H_2O$ (10 weight/volume %). The contents were heated to 60° C. for 2 hours. The film was removed and the excess solution on the surface of the film wiped using a Whatman 4 filter paper and immersed in 1 $NH_3PO_4$ for 2 hours at 60° C. Finally the film was washed well with water till the washings are neutral to litmus paper.

Control Example 2

Sulfonated Poly (Aryl Ether Sulfone)/Phosphotungstic Acid Composite Membranes

A known dimension (4 cm×4 cm) of sulfonated poly(aryl ether sulfone) membrane with % sulfonic acid ~35% was taken in a beaker and added 50 ml of 1 $NH_3PO_4$. The contents were heated at 60° C. for 2 hours. The film was washed well with water till the washings were neutral to litmus paper. The film was then immersed in 50 ml aqueous solution of phosphotungstic acid (10 weight/volume %). The contents were heated to 60° C. for 2 hours. The film was removed and the excess solution on the surface of the film wiped using a Whatman 4 filter paper and dried.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A proton conducting hydrocarbon-based polymer including a semi-fluorinated aromatic hydrocarbon polymer main chain and side chains attached to the main chain, wherein the side chains include from 7 to 10 —CF2— groups in the side chain and an acid group attached to the side chain.

2. The proton conducting polymer defined in claim 1 wherein the main chain includes —$C(CF_3)_2$— groups.

3. The proton conducting polymer defined in claim 1 wherein the acid group comprises a sulfonate group.

4. A proton conducting hydrocarbon-based polymer including an aromatic hydrocarbon polymer main chain and side chains attached to the main chain, the side chains including at least three —CH2-CF2- groups and including a total of from 7 to 10 —CH2- groups plus —CF2- groups and the side chains including a terminal acid group.

5. The proton conducting polymer defined in claim 4 wherein the acid group comprises a sulfonate group.

6. The proton conducting polymer defined in claim 3 wherein the side chains include from 8 to 10 —CF2- groups.

7. The proton conducting polymer defined in claim 6 wherein the side chains consist essentially of the —CF2- groups and the terminal sulfonate group.

8. The proton conducting polymer defined in claim 6 wherein the side chains include from 9 to 10 —CF2- groups.

9. The proton conducting polymer defined in claim 8 wherein the polymer is selected from the group consisting of polysulfones, polyether ketones, polyether ether ketones, polyether sulfones, and polythioether sulfones.

10. The proton conducting polymer defined in claim 1 further including an inorganic additive chemically bonded to the polymer that improves the properties of the polymer.

11. The proton conducting polymer defined in claim 5 wherein the side chains include a total of from 8 to 10 —CH2- groups plus —CF2- groups.

12. The proton conducting polymer defined in claim 11 wherein the side chains consist essentially of the —CH2- and —CF2- groups and the terminal sulfonate group.

13. The proton conducting polymer defined in claim 11 wherein the side chains include a total of from 9 to 10 —CH2- groups plus —CF2- groups.

14. The proton conducting polymer defined in claim 13 wherein the polymer is selected from the group consisting of polysulfones, polyether ketones, polyether ether ketones, polyether sulfones, and polythioether sulfones.

15. The proton conducting polymer defined in claim 4 further including an inorganic additive chemically bonded to the polymer that improves the properties of the polymer.

* * * * *